Sept. 30, 1969    W. H. AYER    3,469,444
LAUNCHING APPARATUS
Filed July 17, 1967    8 Sheets-Sheet 1

INVENTOR
WILLIAM H. AYER
BY
Nolte & Nolte
ATTORNEYS

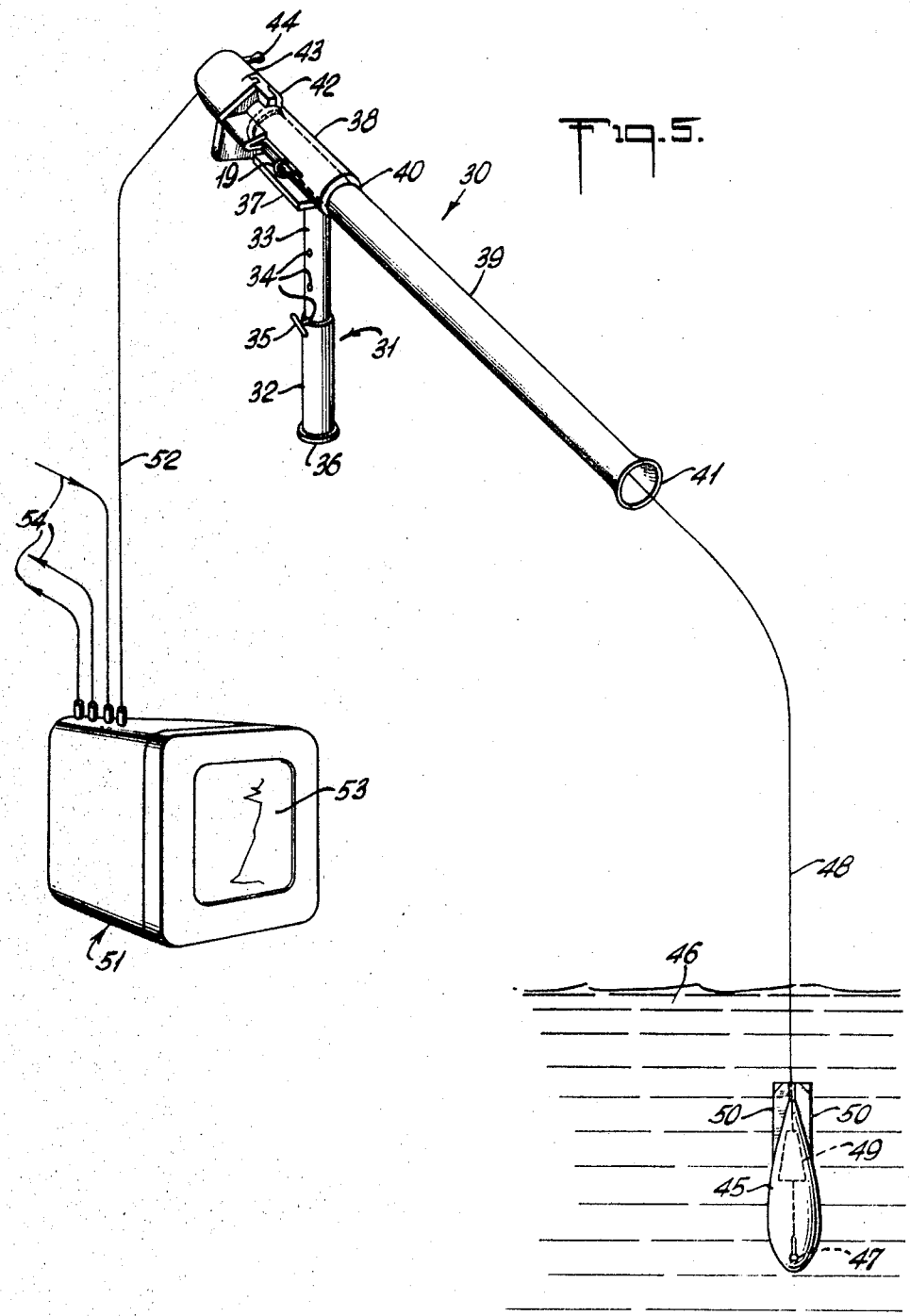

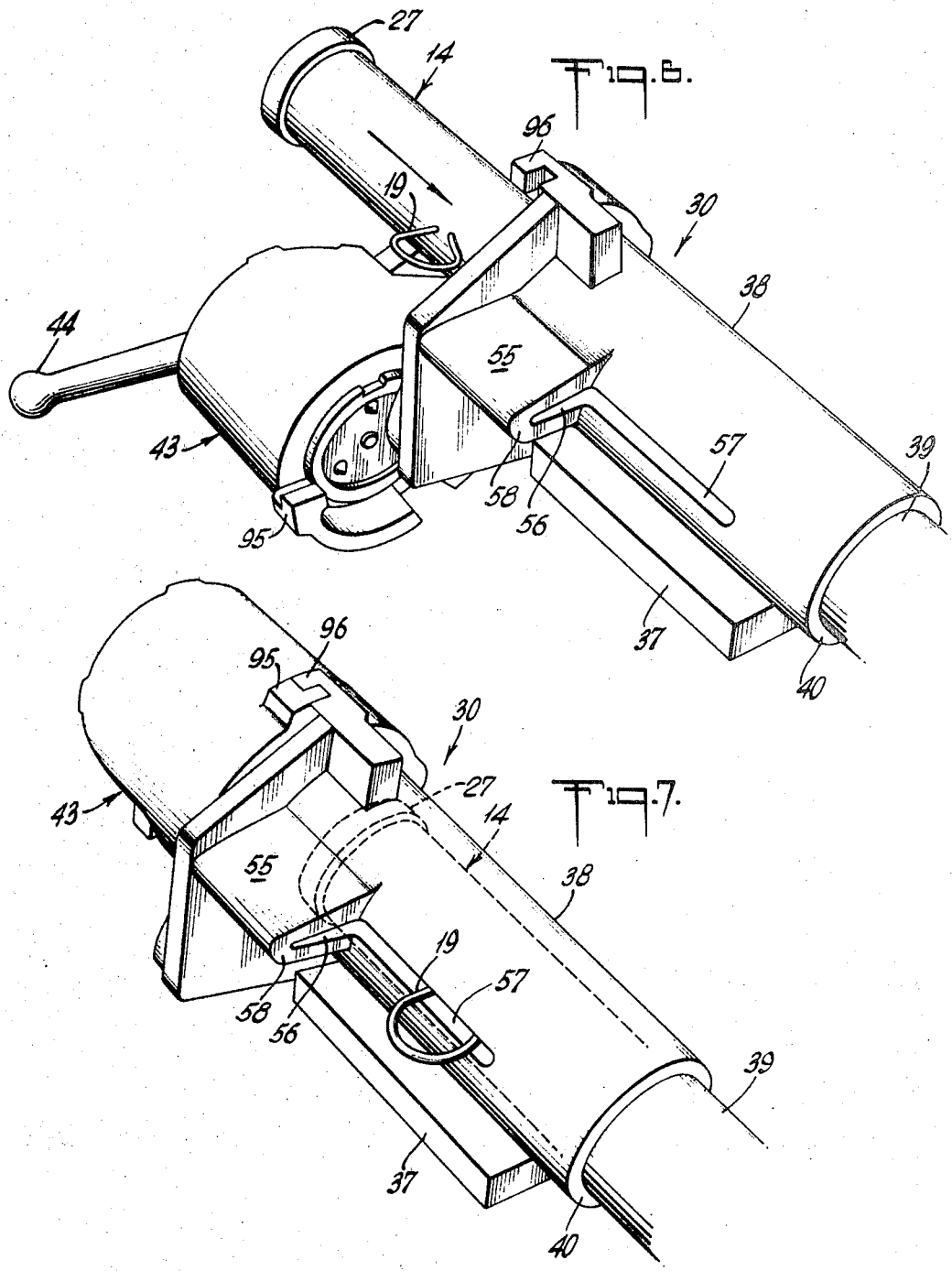

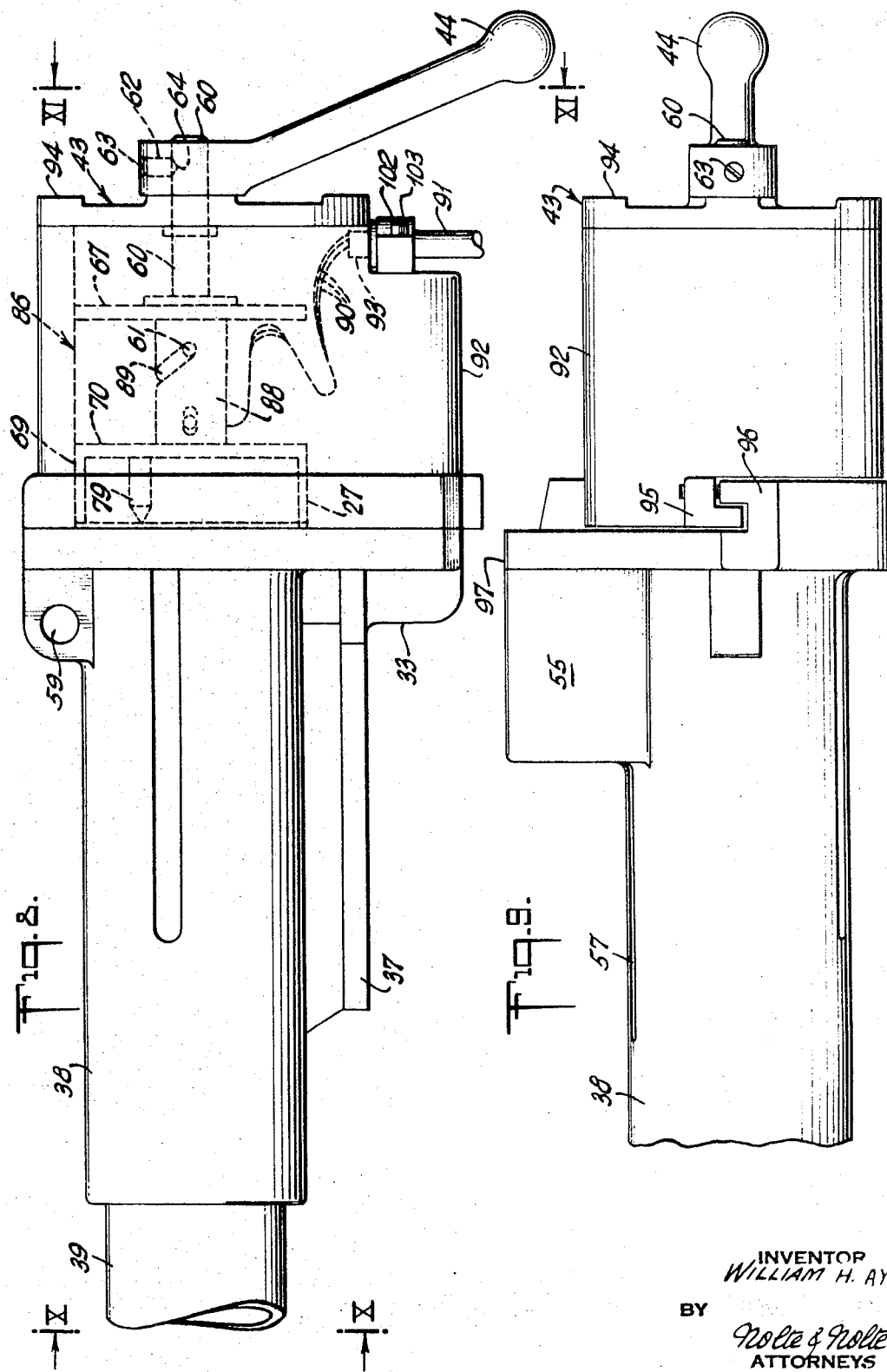

Sept. 30, 1969 W. H. AYER 3,469,444
LAUNCHING APPARATUS
Filed July 17, 1967 8 Sheets-Sheet 5
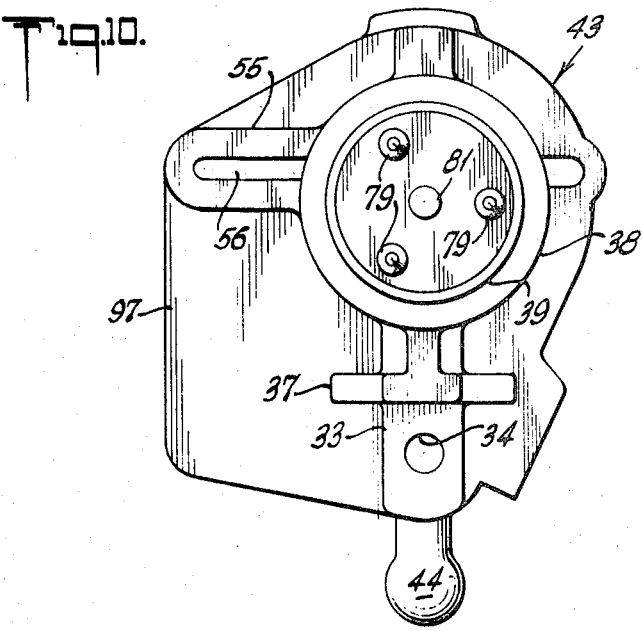
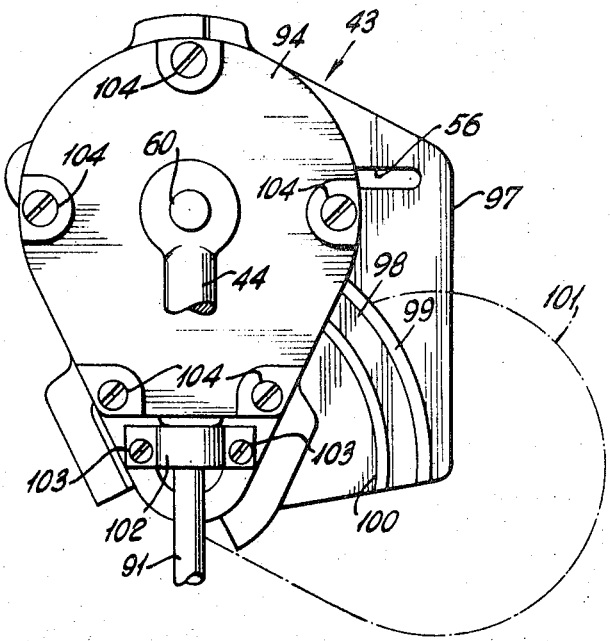
INVENTOR
WILLIAM H. AYER
BY
Nolte & Nolte
ATTORNEYS

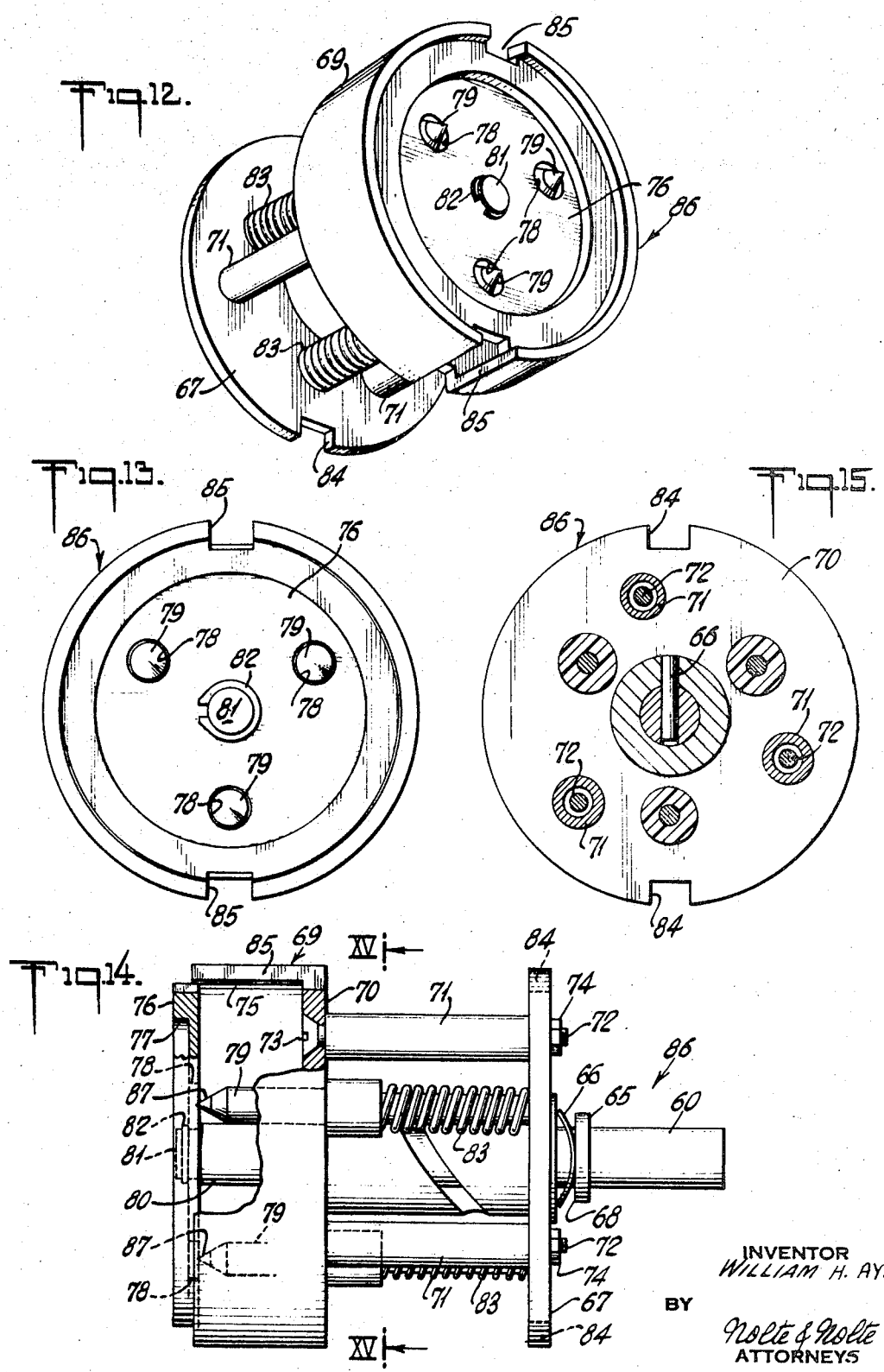

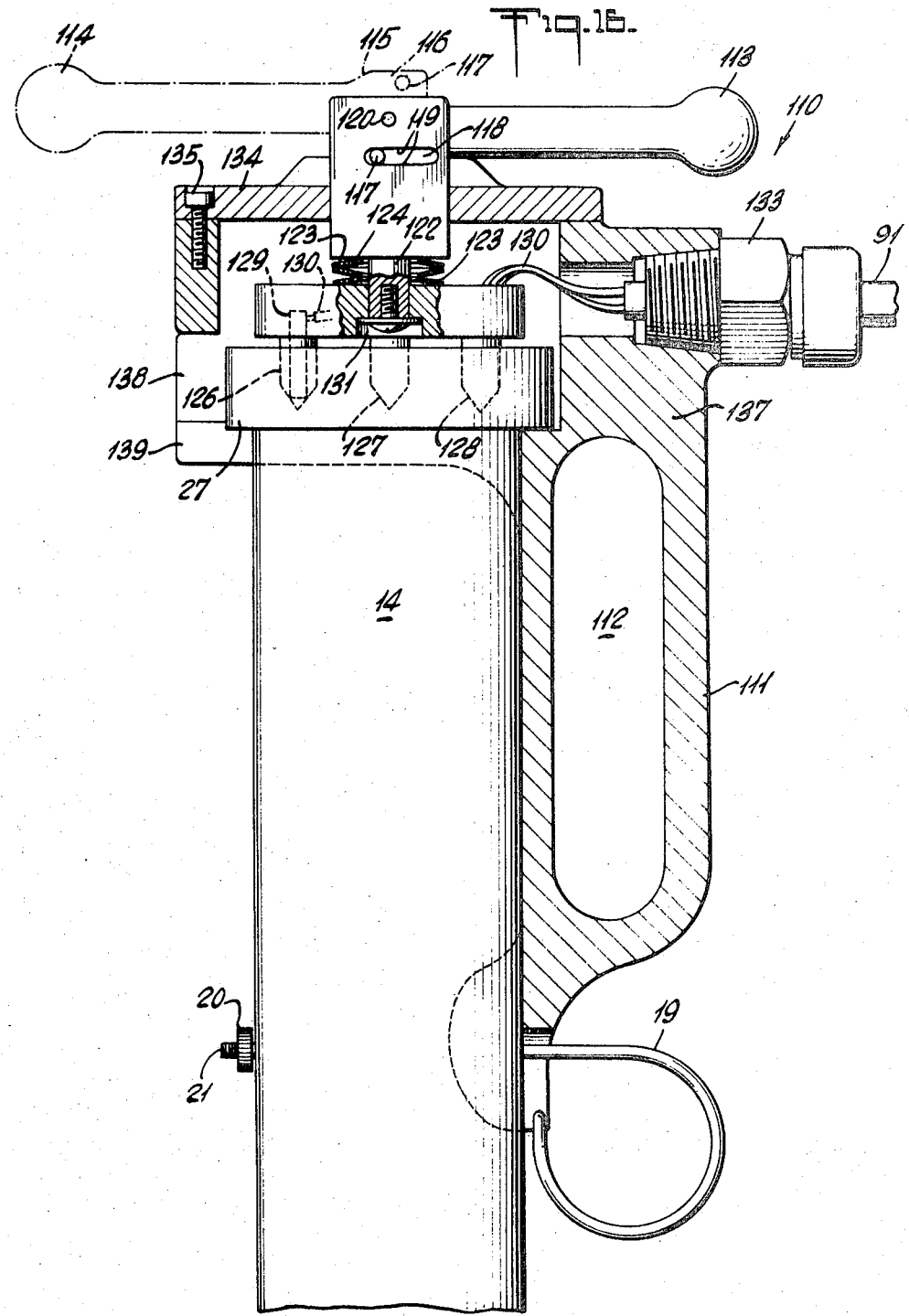

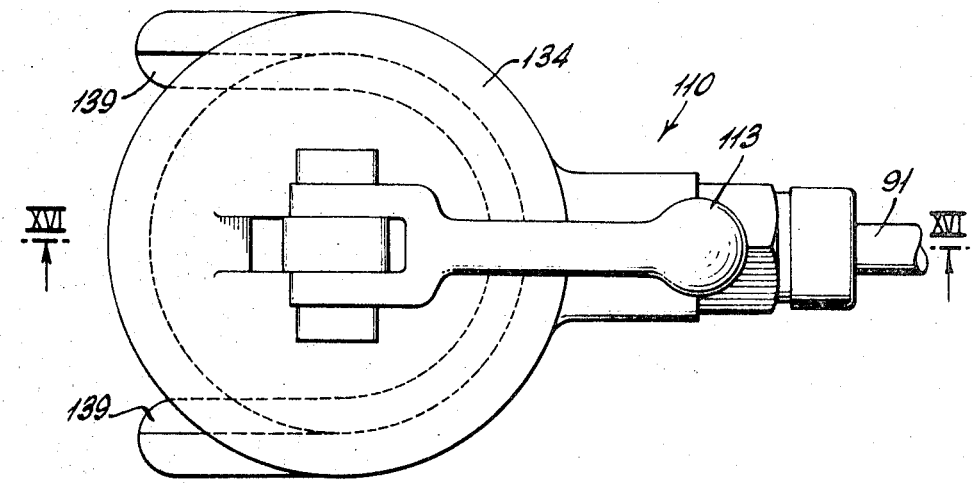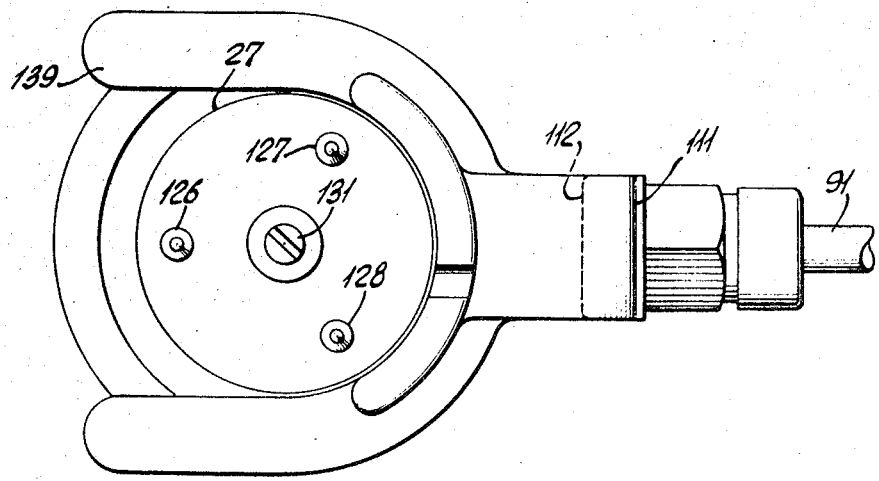

United States Patent Office 3,469,444
Patented Sept. 30, 1969

3,469,444
LAUNCHING APPARATUS
William H. Ayer, Scituate, Mass., assignor to Buzzards Corp., Marion, Mass., a corporation of Massachusetts
Filed July 17, 1967, Ser. No. 653,806
Int. Cl. G01w 1/08
U.S. Cl. 73—170
10 Claims

ABSTRACT OF THE DISCLOSURE

The present invention includes a launching apparatus having an adjustable support assembly, a housing portion integral with said support assembly for containing a canister assembly, a tubular member secured to said housing portion for guiding a probe initially contained within the canister and a breech assembly secured to the housing portion for electrically connecting the canister assembly to remote measuring apparatus.

---

This invention relates to apparatus for measuring a property of the ocean, a body of water or a fluid with respect to depth and more particularly to a launching apparatus and connector means for launching a probe into the fluid.

In large bodies of water, properties such as temperature and salinity, change considerably with respect to depth. There are many reasons why it is desirable to detect and record these properties at different points in the ocean. For example, the variation of temperature or the existence of low-depth liquid layers at a specific temperature can seriously affect the properties of acoustical energy as it is propagated through the water. Such changes adversely affect the performance of sonar devices such as weapons systems and commercial devices used in fish detecting equipment.

The object of the present invention is to provide a launching system for aquatic measuring apparatus.

Another object of the present invention is to provide a launching apparatus which may be used with aircraft.

Still another object of the present invention is to provide a launching apparatus for use with sea-going vehicles.

Another object of the invention is to provide a launching apparatus for cooperative use with remote measuring apparatus.

A further object is to provide apparatus which is adapted to receive a canister containing a bathythermograph probe, which canister possesses means for releasably holding the probe and the apparatus and being adapted to make electrical contact with the canister and the probe.

A still further object of the present invention is to provide an improved breech-operated launching apparatus adapted to make electrical contact with bathythermograph devices and which is inexpensive to manufacture and is easily adapted to make rapid deployments of probes from standing or moving vehicles with respect to the fluid into which the probe is to be deployed.

Another object of the present invention is to provide a portable hand-operated launching device capable of being held by an individual during deployment of a measuring probe.

The present invention fulfills the aforementioned objects and overcomes limitations and disadvantages of prior art solutions to problems by providing, in one embodiment of the present invention, a launching apparatus which is secured to a desirable portion of a sea-going vessel. The launching apparatus (launcher) includes an adjustable base portion having a predetermined number of degrees of freedom which will enable the launcher to be set at a given height from the deck of the vessel or other portion of the ship to which the launcher is secured, as well as providing 360 degree adjustment such that the angle of deployment of a device such as a bathythermograph probe with respect to the vehicle may be pre-established. The adjustable base may consist of slidable concentric tubular members, one of which has an inside diameter slightly larger than the outside diameter of the second, the larger member being secured to the deck of a ship as by welding or bolting. A plurality of holes or cavities are formed determined distances apart, the locus of centers of such holes defining a straight line substantially parallel to the longitudinal axis of the second tubular member through which the holes are formed. A locking pin or other suitable means for entry into the holes or cavities will establish the height of the launcher above the deck to which the base is secured.

A casting, having a tubular-shaped portion, is secured to the second tubular member which has been described as being slidably disposed within the base tubular member. The casting will be referred to as a housing portion in order to emphasize the fact that the method of manufacture thereof is not intended to be limited to casting or moulding. The housing portion has secured to the forward end thereof a relatively long discharge tube having at its extremity a flared opening. The housing has formed therethrough an opening having a cylindrical portion, which opening communicates with the bore of the discharge tube. At its rearward end, the housing portion has pivotally secured thereto a canister loading breech which is adapted to expose a rearward portion of the cylindrical bore within said housing portion for insertion of a canister or housing containing a bathythermograph probe. The canister loading breech is electrically connected to remote measuring apparatus, such as a recorder which will indicate to an observer temperature versus depth information relating to the fluid to be measured. The canister loading breech is further equipped with a breech handle which is pivotally connected to the breech in a manner which will enable the movement of spring loaded pins which are adapted to make electrical contact with portions of a canister which has been inserted into the cylindrical opening within the housing portion.

In operation, the launcher breech is opened and a canister is inserted into the housing portion. The breech is closed by rotating a breech handle which thereby causes cam-operated spring-loaded pins in the breech to imbed into soft metal contacts within the canister and which are sealed in a potting compound to insure gas tight and waterproof connection when the breech handle is closed. The closing of the breech handle also automatically makes electrical connection between the remote recording apparatus and the bathythermograph probe disposed within the canister.

The probe is held within the canister by means of a lanyard pin, in one embodiment of the present invention, which lanyard pin extends outwardly through a slot formed in the housing portion. Pulling of the lanyard pin will enable the probe to fall from the housing portion through the opening in the discharge tube and out of the flared opening in the end of the discharge tube, and thereafter into the fluid whose properties are sought to be measured.

In another embodiment of the present invention, the launcher comprises a portable structure equipped with a handle which may be gripped by the user and, instead of being secured to the deck of a ship or to portions of a vehicle, may be conveniently transported to a selected and desirable location for deployment of a probe.

The invention will be more clearly understood from the following description of specific embodiments of the invention together with the accompanying drawings, wherein similar reference characters denote similar elements throughout the several views, in which:

FIG. 5 is a perspective view showing an embodiment of the present invention wherein a tube-type launcher is shown electrically connected to a remote recording device, and further shows the path travelled by a bathythermograph probe after being deployed from the launcher;

FIG. 6 is a fragmentary perspective view of a canister partially inserted into a portion of the launcher shown in FIG. 5;

FIG. 7 is a partial fragmentary persepective view of a canister loaded within the breech of the launcher shown in FIGS. 5 and 6;

FIG. 8 is a fragmentary plan view of an embodiment of the present invention;

FIG. 9 is a fragmentary elevation view of the embodiment shown in FIG 8;

FIG. 10 is an end view of the embodiment shown in FIG 8 taken along line X—X of FIG. 9;

FIG. 11 is a view taken along the line XI—XI of FIG. 8;

FIG. 12 is a perspective view of a cam-operated spring-loaded pin assembly;

FIG. 13 is an end view of the assembly shown in FIG. 12;

FIG. 14 is a partial sectional elevation view of the assembly shown in FIG. 12;

FIG. 15 is a sectional view taken along the line XV—XV of FIG. 14;

FIG. 16 is a partial fragmentary sectional view taken along the line XVI—XVI of FIG. 17;

FIG. 17 is a top plan view of a portable embodiment of the present invention;

FIG. 18 is a plan view of the bottommost portions of the embodiment shown in FIG. 17.

The present invention will be described relative to a bathythermograph probe having a temperature sensing device and its associated launching and measuring systems, however it is to be understood that the principles of the present invention are equally applicable to devices which measure any property of any fluid.

The preferred embodiments of the present invention have particular utility in bathythermograph systems which launch bathythermograph probes from aboard a moving vehicle in order to obtain and measure information relating to a property of a fluid, such as the ocean. In such systems, a bathythermograph probe may be employed which has wound therein in spinning reel configuration a conductor such as a wire or plurality of wires suitably insulated. The wire (or plurality of wires) is of a relatively small diameter and has one portion which is continuously and uninterruptedly connected to a second portion which is wound within a canister or housing in spinning reel configuration. During storage of the probe and prior to deployment thereof, the probe may be housed or contained within a hollow portion of the canister and suitably protected from damage thereto, as by jarring or subjecting same to impact. The canister, as will be more fully described later, includes electrical contact means electrically connected to the wire or plurality of wires wound therein and within the bathythermograph probe. A potting compound may surround such contacts, thereby isolating them from the atmosphere. It should be noted that the wire wound within the bathythermograph probe is electrically connected to a sensing element, which may be a thermistor in the case of a temperature-responsive probe.

The canister remains aboard the vehicle while, upon deployment, the probe is caused to enter the fluid to be measured and descend therethrough, during this time the wire being continuously paid out from both the bathythermograph probe and the canister, such that breakage or damage of the wire will not occur and the speed of the wire with respect to the fluid being measured will be nil or substantially zero.

It is within the scope of the present invention to provide a launching apparatus which will fulfill the aforementioned objects and will enable rapid successive deployments and launchings without damage to any of the elements of the system, facilitating accurate measurement.

Figure 1:
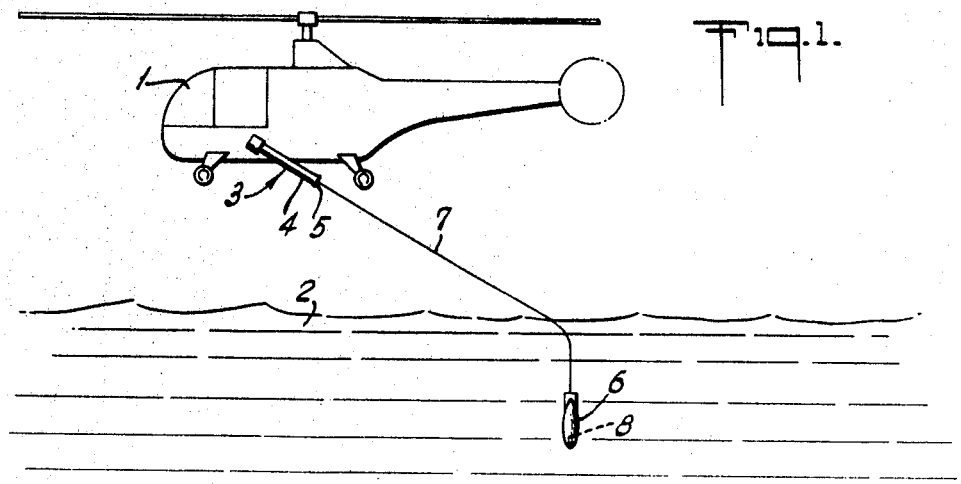
FIG. 1 is a respective view of a launching apparatus mounted in a helicopter and illustrating the deployment of a bathythermograph probe from an aircraft which is moving with respect to a fluid into which the probe has been launched.

Referring now to the drawings, FIG. 1 illustrates apparatus located aboard a helicopter 1 which is representative of many suitable aircraft moving above the surface of a fluid such as the ocean 2. A launcher 3 is diagramatically shown as extending downward and toward the aft portion of helicopter 1. A discharge tube 4 terminates in a flared end 5 through which a bathythermograph probe 6 is deployed into ocean 2. A conductor 7 may consist of a plurality of wires connecting bathythermograph probe 6 to remote measuring apparatus which may be on board helicopter 1 or at another location. A thermistor or other suitable sensing element 8 is associated with bathythermograph probe 6 and is electrically connected to conductor 7 such that a property of the water such as temperatue may be sensed and transmitted to remote measuring apparatus, such that the property may be determined as a function of depth of the water.

Figure 2:
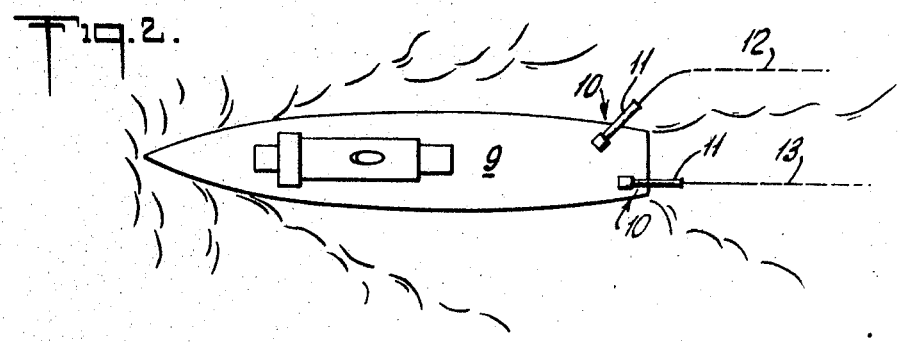
FIG. 2 is a plan schematic view of two launchers according to the present invention mounted on board a sea-going vessel.

FIG. 2 diagrammatically shows a sea-going vessel 9 having two launching devices on board and shown in desirable locations aboard the sea-going vessel. Launchers 10 include discharge tubes 11, as for the case with launcher 3 in FIG. 1, and dotted lines 12 and 13 represent the paths travelled by bathythermograph probes which have been deployed from sea-going vessel 9 through discharge tubes 11.

Figure 3:
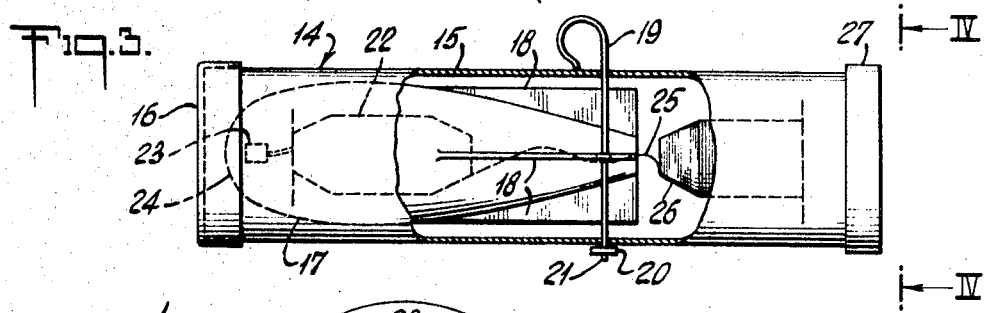
FIG. 3 is a diagrammatic illustration of a canister containing a probe.

FIG. 3 is a partial sectional view of a canister assembly 14 as shown diagrammatically. A cylindrical body portion 15 terminates its open forward end with a protective cap 16 which may include means for positioning a probe 17 within the body portion 15. Probe 17 has at least one fin 18 for stabilizing its descent through the water and a lanyard pin 19 extends through body portion 15, and thereafter through a hole in any one of fins 18 and thence through body portion 15 such that probe 17 is retained within body portion 15. A lock nut 20 prevents lanyard pin 19 from falling from body portion 15 and is designed so as to afford a minimum and maximum retaining force on extremity 21 of lanyard pin 19, such that pin 19 may only be withdrawn by hand with a force of determined magnitude.

Figure 4:
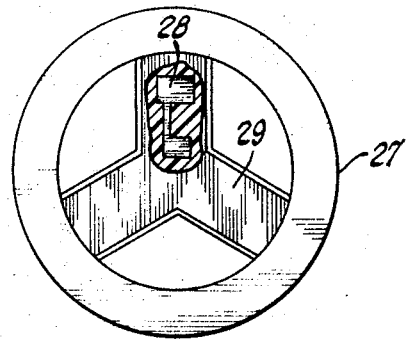
FIG. 4 is a view taken along the line IV—IV of FIG. 3.

A first spool of wire wound in spinning reel configuration is disposed within probe 17, said wire being electrically connected to a sensing element in the form of a thermistor 23 located forward of the spool 22. It is within the scope of the present invention to include the thermistor as being contained within the forward portion of probe 17, or for the thermistor to extend forward of a nose portion 24 of probe 17. Wire 25 continues uninterruptedly and continuously from spool 22 through an opening in the rearward portion of probe 17 and thence to a spool 26 secured to canister body portion 15. A rearward portion 27 of canister assembly 14 is more clearly shown in FIG. 4 to contain a plurality of electrical contacts 28 which are encapsulated in potting compound 29 which is of a relatively penetrable material, such as a suitable epoxy. Electrical contacts 28 are electrically connected to wire 25 which, in turn, is wound on spools 22 and 26 such that electrical contacts 28 are electrically connected to thermistor 23.

Referring now to FIG. 5 of the drawings, a tubular embodiment of the present invention is shown as launcher 30 and adjustable stanchion 31 comprises a base member 32 into which a second tubular member 33 is slidably disposed. A plurality of holes 34 are formed through the wall of second tubular member 33 and are spaced in predetermined distances such that a stanchion locking pin 35 may be inserted for maintaining a constant height of member 33. The bottom of base member 32 may be secured to the deck of a sea-going vessel or other vehicle by welding or by bolting. Numeral designation 36 represents a weldment.

A mounting pad 37 is secured as by welding to second tubular member 33 at the topmost portion thereof. Dovetail housing portion 38 of launcher 30 is slidably secured to mounting pad 37 such that the housing portion is integral with second tubular member 33. A discharge tube 39 is secured to a forward end 40 of dovetail housing portion 38. The housing portion comprises a tubular-shaped casting having formed therethrough a cylindrical opening having a longitudinal axis which coincides with the longitudinal axis of discharge tube 39. Similarly, the opening within dovetail housing portion 38 communicates with the hollow portion of discharge tubes 39. Discharge tube 39 terminates at its extremity in a flared opening 41.

A rearward end 42 of housing portion 38 has pivotally connected thereto a canister loading breech assembly 43 having a breech handle 44 for locking the assembly. During operation, the canister loading breech 43 is opened by means of breech handle 44 such that the cylindrical opening within dovetail housing portion 38 is exposed and a canister assembly is inserted into the housing portion 38 for subsequent deployment of a probe contained within the canister assembly, and the breech handle is closed. Upon the deployment of a bathythermograph probe 45, the probe is caused to pass through discharge tube 39 from rearward end 40 and through flared opening 41; thereafter into fluid 46 such that a sensing element 47 is caused to measure a property of fluid 46. During deployment and also during the measurement of the property of fluid 46 by means of sensing element 47 (thermistor), conductor 48 is caused to be payed out from a spool within a canister, such as previously described for canister assembly 14, while simultaneously conductor 48 is payed out of bathythermograph probe 45 from spool 49 disposed therein such that the relative speed of the conductor 48 with respect to fluid 46 is substantially zero. Fins 50 serve to stabilize the descent of probe 45 while simultaneously and at all times during descent, continuous and uninterrupted conductor 48, which is electrically connected to sensing element 47, transmits information obtained, by means of sensing element 47, to remote measuring apparatus. FIG. 5, in a perspective diagrammatical illustration, shows a recorder 51 which may be part of the remote measuring apparatus. Electrical cable 52 is electrically connected to conductor 48 such that information obtained by sensing element 47 is transmitted through the launcher and canister loading breech to electrical cable 52 for transmission to recorder 51. A property/depth chart 53 provides a permanent record of the temperature of fluid 46 as a function of the depth of the probe 45 at the time such measurement was taken. In the case where the sensing element is a thermistor and the probe is obtaining measurement of fluid temperatures, chart 53 will provide a permanent record of temperature versus depth data. Conductors 54 are shown to illustrate the recorders connection to, for example, an alternating current power source or optional equipment. Recorder 51 may be of a known type and may be portable for transportation from one portion of a vehicle to another during the time of tests and measurements. It should be emphasized that conductor 48 is not in any way limited to a single wire and, on the contrary, where the launching apparatus of the present invention is to be employed with an aircraft, it is within the scope of the present invention to provide conductor 48 with 3 wires for suitable electrical connection with a bathythermograph probe and remote measuring apparatus.

FIG. 6 illustrates in more detail the dovetail housing portion 38 and its associated canister loading breech. As can be seen in FIG. 6, canister assembly 14 having lanyard pin 19 extending therefrom is inserted into the cylindrical opening within housing portion 38. A protuberance 55, which is integral with and forms a part of housing portion 38, has formed therethrough a slot 56 which communicates with a slot 57 formed in the cylindrical portion of housing portion 38. Slots 56 and 57 are provided such that lanyard pin 19 extending from canister assembly 14 will not be obstructed upon the canister assembly's insertion into housing portion 38. Protuberance 55 is of a width such that it terminates with face 58, allowing lanyard pin 19 to extend out from and away from housing portion 38 for grasping thereof by a person wishing to initiate the deployment of a bathythermograph probe contained within canister assembly 14.

The canister loading breech assembly, designated by numeral 43, is shown in an open position in FIG. 6 such that canister assembly 14 is free to be inserted into housing portion 38, while in FIG. 7 the breech assembly 43 is shown in a closed positon, covering the entrance to the opening within housing portion 38. Handle 44 is in its locked position and not visible in FIG. 7.

FIG. 8 shows a side view of the embodiment shown in FIG. 7 and illustrates component parts of breech assembly 43. A hole 59 is formed through housing portion 38 in order to provide means for fastening the housing portion to the vehicle on which the present launching device is used. Handle 44 is secured to a shaft 60 to which, in turn, a pin member 61 is secured as by welding. Pin 61 extends perpendicularly with respect to the longitudinal axis of shaft 60. A set screw 62 may be threaded into aperture 63 in handle member 44 such that set screw 62 penetrates a cavity 64 in the extreme portion of shaft 60. Upon clockwise tightening of set screw 62, end portion of set screw 62 will enter cavity 64 and will prevent relative movement between handle member 44 and shaft 60.

Referring to FIG. 14 wherein components of breech assembly 43 are shown in more detail, flange member 65 is shown fragmentarily as an extension of shaft 60. Leaf spring member 66 is secured to plate member 67 such that surface 68 of flanged member 65 may depress spring 66 and will thereby cause controlled movement of plate member 65 and its associated parts to the left, as viewed in FIG. 14. A collar 69 is shown as being a cylindrical annular ring having a portion 70 which is spaced from and substantially parallel to plate member 67. Portion 70 and plate member 67 have holes formed therethrough respectively and are maintained a predetermined distance apart by means of sleeves 71 which are hollow cylindrical members. Three bolts 72 extend through the holes formed in portion 70 and plate member 67 and have flat heads 73 at one end and threaded portion on the other extremities thereof. Nuts 74 are threaded upon the threaded portions of bolts 72 such that sleeves 71 are sandwiched between portions 70 and plate member 67.

Collar 69 has a cylindrical annular surface 75 of a diameter which exceeds the outside diameter of a locating pad 76. Pad 76 has a recess 77 formed in the bottom thereof and has formed therethrough a plurality of holes 78, preferably three, corresponding to the number of contact pins 79 shown in FIG. 14. Locating pad 76 is slidable with respect to collar 69 such that upon pad 76 being moved to the right in FIG. 14, pins 79 will penetrate holes 78 and extend therethrough for penetration of potting compound 29 of canister assembly 14 shown in FIGS. 3 and 4. Locating pad 76 is slidably secured to the overall breech assembly by means of a member 80 which terminates in a grooved extremity 81, which groove is adapted to receive a retaining ring 82 such that locating pad 76 will not fall free of the assembly. Contact pins 79 are spring loaded by means of helical springs 83 shown in FIGS. 12 and 14 such that, by means of controlling the spring constant of helical spring 83, the penetrating force of contact pins 79 into potting compound 29 may be predetermined and controlled. Thus, by varying the relative viscosity of potting compound 29 and suitably varying the spring constant of helical springs 83, the time within which contact pins 79 may engage contacts 28 encapsulated in potting compound 29, as measured from the time of the closing of the breech by means of handle 44, may be controlled. Grooves 84 and 85 in plate member 67 and collar 69 respectively enable keying of subassembly 86 as viewed in FIGS. 12-14.

Thus, after insertion of canister assembly 14 into the opening within housing portion 38 (FIGS. 6 and 7), breech assembly 43 including subassembly 86 is pivoted into the closed position shown in FIG. 7 and handle 44 is pivoted into a locked position as shown in FIGS. 8 and 9. Pivoting of handle 44 results in a cam-action which causes subassembly 86 to be moved toward the rearward end of canister assembly 14 such that locating pad 76 will engage the rearward end of canister assembly 14 and recess 77 will confine the rearward end. Further movement of handle 44 during its closing results in collar 69 together with subassembly 86 moving toward and over the rearward end of canister assembly 14 such that contact pins 79 are caused to move through holes 78 in locating pad 76 and said contact pins 79 will engage and penetrate the potting compound 29 which covers contacts 28, which contacts are electrically connected to the thermistor located in probe 17 housed in canister assembly 14. Entry of contact pins 79 into potting compound 29 is facilitated by a sharp forward end 87 of pins 79. It is within the scope of the present invention to control the slope and shape of the forward ends 87 of contact pins 79 such that the entrance properties of pins 79 into potting compound 29 are controlled. Upon pins 79 engaging contacts 28, any further movement of subassembly 86 by handle 44 will be taken up in springs 83 such that damage to portions of the canister assembly will not occur. Leaf spring member 66 similarly functions to absorb this further movement.

Referring now to FIG. 8, subassembly 86 is shown in phantom within breech assembly 43. In addition to sleeves 71 separating plate member 67 from portion 70 of collar 69, a member 88, consisting of a cylindrical shell having a slot 89 formed therethrough in a helical-type path, is shown to be connected between portion 70 and plate member 67. It is seen in FIG. 8 that rotation of handle 44 will cause rotation of shaft 60 and pin 61 such that pin 61 will bear upon the edges of slot 89 formed in member 88 such that member 88 and all parts integral therewith will move toward canister assembly 14 within housing portion 38. It is this movement which causes contact pins 79 to move through holes 78 in locating pad 76 such that contact pins 79 engage contacts 28 embedded in potting compound 29.

Pins 79 are electrically connected to remote measuring apparatus by means of conductors 90 which are connected to each of pins 79 and are also electrically connected to cable 91, cable 91 connecting the breech assembly 43 to remote measuring apparatus such as the recorder 51 shown in FIG. 5. In a preferred embodiment of the present invention cable 91 will correspond to electrical cable 52 shown in FIG. 5. Breech assembly 43 has a housing 92 which encloses and contains subassembly 86. Conductors 90 terminate in a fitting or electrical connector 93 disposed in a portion of housing 92. An end cap 94 is secured to housing 92 by means of screws or other suitable fastening means. End cap 94 has an opening formed therethrough such that shaft 60 may be journalled within such opening.

FIG. 9 shows the plan view of the structure shown in FIG. 8 and further illustrates the tongue-in-groove-type engagement of member 95 into receptacle 96. The engagement of member 95 with receptacle 96 occurs upon breech assembly 43 being pivoted into its closed position and it is within the scope of the present invention to control the dimensions of members 95 and 96 such that proper alignment and consistant location of breech assembly 43 occurs with every closing of the breech assembly.

Referring now to FIG. 10 which is a view taken along the line X—X of FIG. 8, a view looking into the discharge of the present launching device shows the breech in a closed position. The outline of web 97 is shown, web 97 serving as an abutment member and having formed therein a groove 98 which can be seen in FIG. 11 (in which the opposite side of web 97 is shown). Raised portions 99 and 100 define the boundaries of groove 98, which groove is used to define the path of the pivotal movement of breech assembly 43 when it is either being opened or closed. FIG. 11 shows breech assembly 43 in a closed position in full line, while phantom outline 101 designates the position reached by breech assembly 43 when open. Cable 91 is shown as terminating in a portion which is retained by a strain-relief clamp 102, clamp 102 being bolted by means of bolts 103 to breech assembly 43. Fasteners 104 are shown as securing end cap 94 to housing 92.

Referring now to FIG. 16, a portable embodiment of the present invention is shown and generally designated as assembly 110. A handle 111 is provided with an aperture 112 through which the fingers of the user may extend for gripping of handle 111 during launching and deployment of a bathythermograph probe initially contained within canister assembly 14. Locking arm 113 is shown in full lines in its locked position and is shown in phantom outline 114 in its unlocked position. A cam 115 is secured to locking arm 113 and has extending perpendicularly from face 116 thereof at least one pin 117, pin 117 extending into a slot 118 having parallel and opposite bearing surfaces 119.

Pin 117, upon the pivoting of locking arm 113 about its pivot pin 120, will cause the former to bear against one of surfaces 119, thereby forcing subassembly 121 downward against canister assembly 14. Member 122 transmits the force exerted by cam 115 against subassembly 121. Spring washers 123 provide resilience such that there is a cushioning of subassembly 121 against surface 124 of housing 125. It is through housing 125 that slot 118 and its respective bearing surfaces 119 are formed. Three contact pins 126, 127 and 128 respectively may be structurally similar or identical with contact pins 79 shown in subassembly 86 in FIG. 14. In a preferred embodiment of the present invention, contact pins 126–128 are formed with an inner member 129 which is made of an electrically conductive material and has electrically connected thereto electrical conductors 130. Conductors 130 electrically connect pins 126–128 to cable 91 which is, in turn, connected to remote measuring apparatus. Subassembly 121 is secured to member 122 by means of a screw 131 which engages both pin housing 132 and member 122. A suitable fitting 133 or other electrical connection may be used to connect conductors 130 with cable 91 such that the electrical properties of the present invention are not disturbed and freedom of contamination from the atmosphere is achieved.

An end cap 134 is secured by means of screws 135 to an annular portion 136 of handle housing 137. Opening 138 is provided such that rearward portion 27 of canister assembly 14 may be inserted therethrough and will come to rest against protruding portion 139 of handle housing 137.

Thus, the user of the present device inserts a canister assembly 14 through opening 138 in handle housing 137, and thereafter pivots locking arm 113 from position 114 to that shown in FIG. 16 and, at a predetermined time, the user extracts lanyard pin 19 such that a probe contained within canister assembly 14 will enter the water. The position of the respective parts described for FIG. 16 are further illustrated in FIGS. 17 and 18.

The embodiments of the invention particularly disclosed are presented merely as examples of the invention. Other embodiments, forms and modifications of the invention coming within the proper scope of the appended claims will of course readily suggest themselves to those skilled in the art.

What is claimed is:

1. A launcher, comprising an adjustable support assembly, a housing portion integral with said support assembly having a hollow portion formed therethrough, said hollow portion connecting first and second ends of said housing portion, a tubular member having a rear end secured to said first end of the housing such that said hollow portion communicates with the interior of said tubular member, and a breech assembly secured to said housing portion for cooperative engagement with said second end.

2. A launcher, according to claim 1 wherein said adjustable support comprises a base member secured to a vehicle, a second member slidably disposed within said base member and having a plurality of holes therethrough and spaced longitudinally, and locking means for preventing movement of said second member with respect to said base member.

3. A launcher, comprising an adjustable stanchion having a selected number of degrees of freedom, a mounting pad secured to a portion of said stanchion, a housing slidably secured to said mounting pad and having an opening formed therethrough for receiving a canister assembly, said housing also having a slot formed through a portion thereof and communicating with said opening, said slot adapted to receive a launching pin extending outwardly from said canister assembly, a tubular member secured to a forward portion of said housing such that a hollow portion of said tubular member communicates with said opening, said tubular member being formed with a flared portion at an extremity, and a breech assembly pivotally secured to said housing for locking said canister assembly within said opening and for making electrical contact with components of said canister assembly, said breech assembly comprising cam actuated pin means for penetrating a portion of the canister assembly, a handle for actuating said pin means, conductor means for electrically connecting said breech assembly to remote measuring apparatus.

4. In a launching assembly for a measuring system of the type including a measuring probe releasably secured in a canister, wherein said probe is adapted to be released for descent into a body of water and includes a spool of wire connected to water-property measuring means in said probe, and wherein said canister has contact means imbedded in a penetrable material and connected to said wire; the improvement wherein said launching assembly comprises housing means for holding said canister contact pin means, and means for locking said canister in position with respect to said housing means and urging said pin means through said penetrable material into electrical contact with said contact means.

5. In a launching assembly for a measuring system of the type including a probe device adapted to measure a property of a body of water during descent of said probe device through said water, wherein said probe device is releasably secured in a canister, wherein said canister has contact means imbedded in a penetrable material in one end thereof, and wherein said measuring system further includes conductor means extending between said probe device and said contacts; the improvement wherein said launching assembly comprises a housing having a chamber, said chamber having an opening in one end thereof for receiving said canister, a tubular member extending from the other end of said chamber for directing said probe device into said body of water, breech assembly means, and means for pivotally mounting said breech assembly means to close said opening, said breech assembly means comprising means for locking said canister in said chamber, pin means aligned with said contact means when said opening is closed, and means for urging said pin means through said penetrable material to establish electrical contact with said contact means.

6. The launching assembly of claim 5 wherein said means for pivotally mounting said breech assembly comprises means for moving said breech assembly about an axis parallel to the axis of said chamber, and said means for urging said pin means comprises lever means rotatable about an axis parallel to the axis of said chamber, and cam means responsive to rotation of said lever means for moving said pin means in a direction parallel to the axis of said chamber.

7. The launching assembly of claim 6 wherein said breech assembly comprises locating pad means responsive to said cam means for axially engaging said one end of said canister, said locating pad means having apertures aligned with said pin means, and wherein said breech assembly further comprises spring means positioned to control the pressure of said pin means against said contact means.

8. In a launching assembly for a measuring system of the type including a probe device adapted to measure a property of a body of water during descent of said probe device through said water, wherein said probe device is releasably secured in a canister, wherein said canister has contact means imbedded in a penetrable material in one end thereof, and wherein said measuring system further includes conductor means extending between said probe device and said contacts; the improvement wherein said launching assembly comprises housing means, said housing having an opening for receiving said one end of said canister whereby said canister is moveable sidewise into launching position in said housing means, said housing having protruding members for engaging said one end of said canister for preventing axial movement of said canister in one direction, contact pin means aligned with said contact means in said housing, locking arm means, and resilient means for connecting said locking arm means to said pin means for urging said pin means through said penetrable material to establish electrical connection with said contact means.

9. The launching assembly of claim 8 comprising means pivotally mounting said locking arm means for movement about an axis normal to the axis of said canister, said locking arm means including cam means, assembly means for holding said pin means, and means responsive to movement of said cam means for resiliently urging said assembly means for movement in an axial direction with respect to the axis of said canister.

10. A canister assembly for use in a system for measuring a property of a body of water, said canister assembly comprising an elongated cylindrical canister, a measuring probe unit positioned within said canister, said probe unit comprising a water-property measuring device, and a spool of wire having one end connected to said measuring device, said probe unit being adapted to descend through said body of water, a second spool of wire mounted in said canister adjacent one end thereof, one end of said second spool of wire being connected to the other end of said first mentioned spool of wire, contact means imbedded in a penetrable material in said one end of said canister, said contact means being connected to the other end of said second spool of wire, protective cap means covering the other end of said canister, and pin means extending through said canister and a portion of said probe unit for releasably holding said probe unit within said canister.

References Cited

UNITED STATES PATENTS

| | | |
|---|---|---|
| 2,472,111 | 6/1949 | Kroeger et al. _____ 89—25 X |
| 3,339,407 | 9/1967 | Campbell et al. |
| 3,349,613 | 10/1967 | Francis. |

RICHARD C. QUEISSER, Primary Examiner

JERRY W. MYRACLE, Assistant Examiner